United States Patent
Fleck

(10) Patent No.: US 9,321,302 B2
(45) Date of Patent: Apr. 26, 2016

(54) FLEXIBLE WHEEL COVER ASSEMBLY

(71) Applicant: Moochout LLC, St. Paul, MN (US)

(72) Inventor: Jonathan E. Fleck, St. Paul, MN (US)

(73) Assignee: Moochout LLC, St. Paul, MN (US)

( * ) Notice: Subject to any disclaimer, the term of this patent is extended or adjusted under 35 U.S.C. 154(b) by 0 days.

(21) Appl. No.: 14/542,187

(22) Filed: Nov. 14, 2014

(65) Prior Publication Data

US 2015/0151569 A1 Jun. 4, 2015

Related U.S. Application Data

(60) Provisional application No. 61/904,668, filed on Nov. 15, 2013.

(51) Int. Cl.
*B60B 7/02* (2006.01)
*B60B 7/00* (2006.01)
*B60B 7/06* (2006.01)

(52) U.S. Cl.
CPC ............... *B60B 7/02* (2013.01); *B60B 7/0033* (2013.01); *B60B 7/0066* (2013.01); *B60B 7/066* (2013.01); *B60B 2900/113* (2013.01); *B60B 2900/1216* (2013.01); *B60B 2900/541* (2013.01); *B60B 2900/572* (2013.01); *B60Y 2200/14* (2013.01)

(58) Field of Classification Search
CPC ...... B60B 7/02; B60B 7/0026; B60B 7/0033; B60B 7/0066; B60B 7/06; B60B 7/066; B60B 2900/121; B60B 2900/1216; B60B 2900/511; B60B 2900/541; B60B 2900/572
USPC ............... 301/37.101, 37.102, 37.108, 37.42, 301/37.43
See application file for complete search history.

(56) References Cited

U.S. PATENT DOCUMENTS

| 1,167,124 A | * | 1/1916 | Sloper | ........... | B60B 7/0006 |
| | | | | | 301/37.104 |
| 1,503,397 A | | 10/1923 | Wacker | | |
| 2,903,300 A | | 9/1959 | Hurd | | |
| 3,317,247 A | * | 5/1967 | Lamme | ........... | B60B 7/16 |
| | | | | | 301/37.38 |

(Continued)

FOREIGN PATENT DOCUMENTS

| CN | 2551488 Y | 5/2003 |
| DE | 104454 | 5/1923 |

(Continued)

OTHER PUBLICATIONS

International Search Report and Written Opinion, PCT/US2007/078155, dated Jun. 11, 2008, 7 pages.

(Continued)

*Primary Examiner* — John Walters
(74) *Attorney, Agent, or Firm* — Polsinelli PC

(57) ABSTRACT

Implementations described and claimed herein provide systems and methods for improving the aesthetic and aerodynamic characteristics of a wheel, while facilitating inspection of one or more components associated with the wheel. In one implementation, a flexible wheel cover assembly includes a flexible wheel cover comprising a sheet of material having an essentially round-shaped outer periphery and a center axis. A bracket physically couples the flexible wheel cover to a wheel hub of a vehicle, such that the center axis of the flexible wheel cover is aligned with a wheel axis. The sheet of material has a flexibility sufficient to bend while the wheel is stationary and flatten against a tire mounted on the wheel when the wheel is turning.

9 Claims, 3 Drawing Sheets

(56) References Cited

U.S. PATENT DOCUMENTS

| | | | |
|---|---|---|---|
| 4,241,954 A | 12/1980 | Brown | |
| 4,620,749 A | 11/1986 | McEachern | |
| 4,836,615 A * | 6/1989 | Berg | B60B 7/0006 |
| | | | 301/37.109 |
| D303,648 S | 9/1989 | Clark | |
| 5,897,172 A | 4/1999 | Jarrell | |
| 7,121,631 B2 * | 10/2006 | Strzelczyk | B60B 7/0026 |
| | | | 301/37.108 |
| 2005/0206220 A1 | 9/2005 | Polka | |

FOREIGN PATENT DOCUMENTS

| | | |
|---|---|---|
| DE | 500213 | 5/1930 |
| FR | 396797 | 4/1909 |
| JP | 59-192675 | 11/1984 |
| JP | 62-157803 A | 7/1987 |
| WO | WO 00/54991 | 9/2000 |

OTHER PUBLICATIONS

Office Action, Canadian Patent Application No. CA2698664, mailed Aug. 2, 2013, 2 pages.

Response to Office Action, Canadian Patent Application No. CA2698664, filed Feb. 4, 2014, 4 pages.

Notice of Allowance, Canadian Patent Application No. CA2698664.

First Office Action, Chinese Patent App. No. 201310188977.6, mailed Nov. 3, 2014, 8 pages.

Response to First Office Action, Chinese Patent App. No. 201310188977.6, filed Mar. 13, 2015, 5 pages.

Second Office Action, Chinese Patent App. No. 201310188977.6, mailed May 25, 2015, 12 pages.

Response to Second Office Action, Chinese Patent App. No. 201310188977.6 filed Aug. 5, 2015, 6 pages.

* cited by examiner

# FLEXIBLE WHEEL COVER ASSEMBLY

CROSS-REFERENCE TO RELATED APPLICATIONS

The present application claims benefit of priority under 35 U.S.C. §119 to U.S. Provisional Patent Application No. 61/904,668, entitled "FLEXIBLE WHEEL COVER ASSEMBLY" and filed Nov. 15, 2013, which is incorporated by reference in its entirety herein.

TECHNICAL FIELD

Aspects of the present disclosure relate to covers for vehicle wheels and more particularly to a flexible wheel cover assembly.

BACKGROUND

Wheel designs for vehicles (e.g., heavy trucks, trailers, or the like) typically include a metal wheel (e.g., a rim) onto which a pneumatic tire may be mounted. Conventional wheel designs generally fail to consider the overall aesthetic appeal or aerodynamic efficiency of the wheel. Further, while some rim covers (e.g., hub caps) seek to cover unsightly aspects of the rim, such rim covers typically prevent or otherwise hinder inspection of potential problems associated with the wheel that may develop during movement. It is with these, issues in mind, among others, that various aspects of the present disclosure were developed.

SUMMARY

Implementations described and claimed herein address the foregoing problems, among others, by improving the aesthetic and aerodynamic characteristics of a wheel, while facilitating inspection of one or more components associated with the wheel. Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
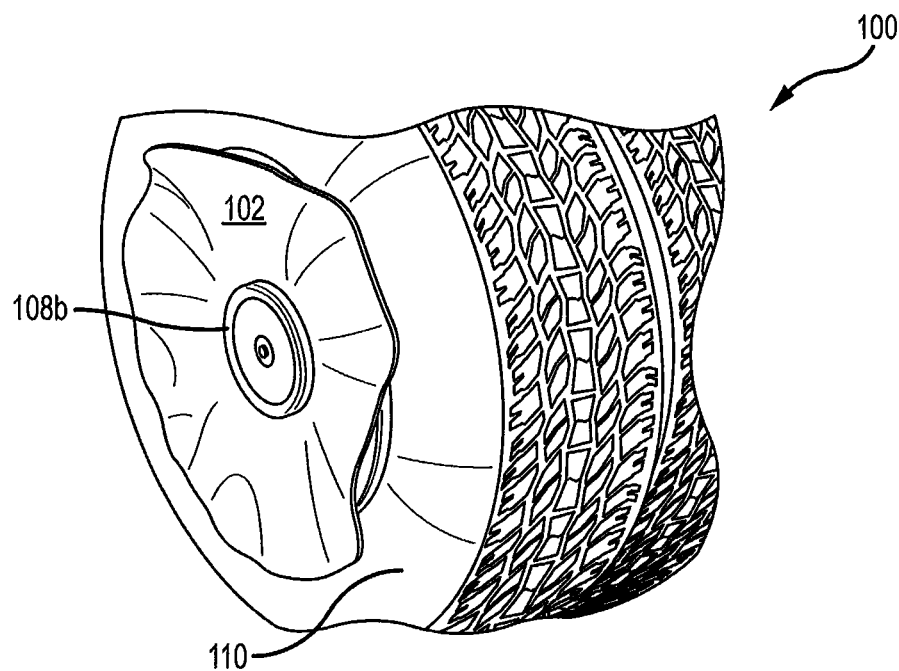
FIGS. 1 and 2 illustrate an example flexible wheel cover assembly configured on a wheel of a truck according to the teachings of the present disclosure.

Aspects of the present disclosure involve a flexible wheel cover assembly for various vehicles, such as trucks, trailers, buses, long-haul tractor trailer rigs, or the like. In one example, the flexible wheel cover assembly is used in conjunction with wheels that do not have an exposed drop center, such as wide based wheels. However, other vehicle and/or wheel types are contemplated.

In one aspect, the flexible wheel cover assembly improves the aesthetic and aerodynamic characteristics of a wheel, while facilitating inspection of one or more components associated with the wheel. The flexible wheel cover assembly includes a wheel cover mounted to one or more components of the wheel, such as a wheel hub, using a bracket. The wheel cover is a sheet of flexible material having a generally circular outer periphery and a center axis. The bracket directly or indirectly mounts the wheel cover to the wheel hub, such that the center axis of the flexible wheel cover is generally aligned with an axis of the wheel.

The wheel cover has a flexibility sufficient to bend while the wheel is stationary and flatten against a tire mounted on the wheel when the wheel is turning. Stated differently, while the vehicle is stationary, gravity causes at least a portion of the wheel cover to bend away from the wheel, and while the vehicle is in motion, centrifugal forces associated with the rotation of the wheel cause the wheel cover to flatten against the wheel forming an aerodynamic surface. As such, the flexible cover assembly facilitates a hands-free inspection of the wheel while the vehicle is stationary and increases aerodynamic efficiency of the wheel while the vehicle is moving. Further, the outer periphery of the flexible wheel cover may be greater than a diameter of the wheel and less than a diameter of the tire to provide an aesthetic impression of a larger rim and a lower profile tire when the flexible wheel cover flattens against the tire during movement.

In colder climates, air brakes, on vehicles, such as trailers, have a tendency to freeze, thereby preventing the associated wheel from rotating. If the vehicle is driven under these conditions, the frozen brakes are likely to flat spot or otherwise ruin the associated tire. However, it is often challenging for drivers to recognize the presence of these conditions. As such, the flexible wheel cover may be mounted such that the cover is prevented from moving independently of the bracket and/or the wheel, thus providing a visual indication of whether the brakes of a wheel are frozen. For example, the flexible wheel cover assembly provides a visual indication of a frozen wheel where the flexible wheel cover is in a bent state while the vehicle is moving, as opposed to a flattened state.

For a detailed description of an example flexible wheel cover assembly 100, reference is made to FIGS. 1-4. The flexible wheel cover assembly 100 generally includes a flexible wheel cover 102 mounted a wheel hub 104 using a bracket 106. The flexible wheel cover assembly 100 may also have a pair of disks 108a and 108b that sandwich the flexible wheel cover 102 therebetween when mounted on the wheel hub 104. The wheel hub 104 is positioned at a center of a wheel 111, which includes a rim or outer edge to hold a tire 110.

Figure 2:
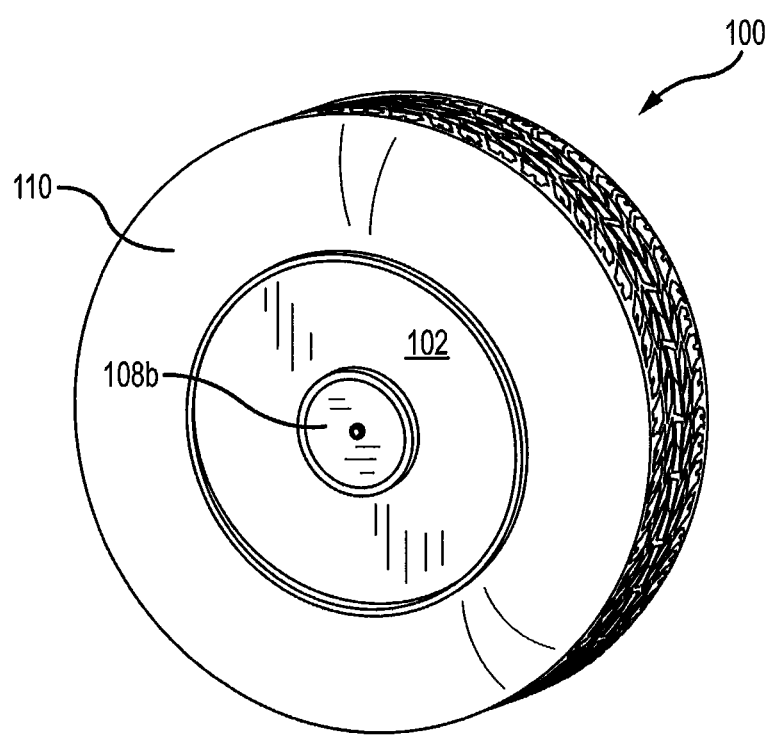
Figure 3:
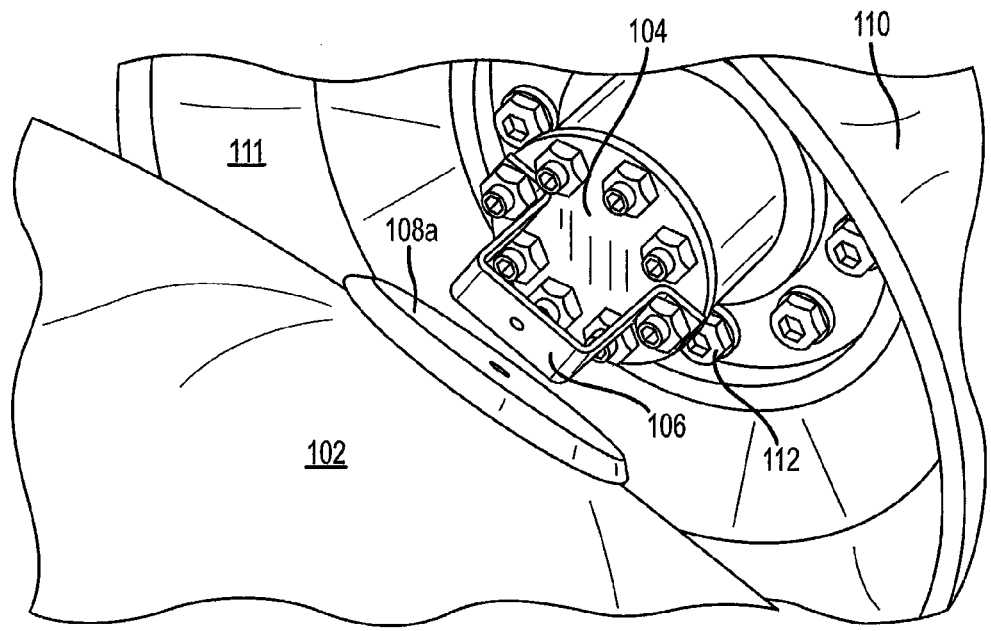
FIGS. 3 and 4 illustrate various elements of the wheel cover assembly according to the teachings of the present disclosure.
Figure 4:
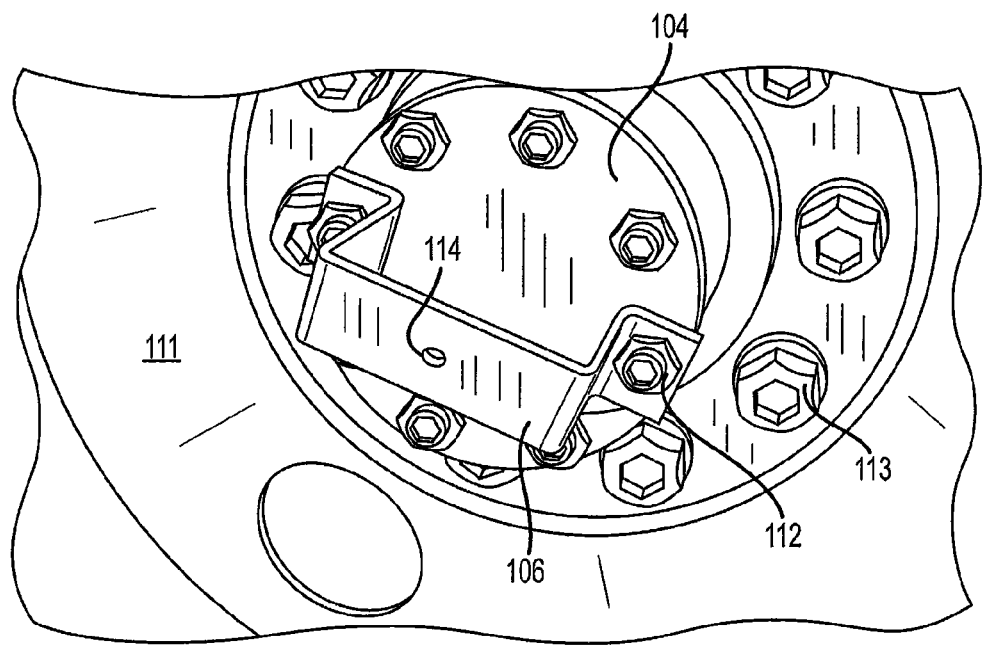

As shown in FIG. 1, when the wheel 111 is stationary (i.e., not rotating), gravity causes the flexible wheel cover 102 to bend. However, when the wheel 111 is rotating, centrifugal forces associated with the rotation cause the flexible wheel cover 102 to flatten against the tire 110 into an aerodynamic surface, as shown in FIG. 2.

Figure 5:
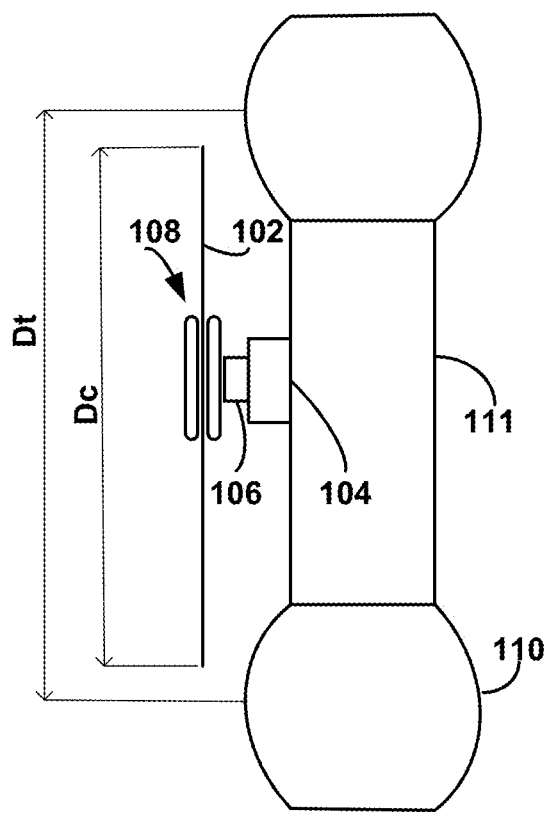
FIG. 5 illustrates a profile view of an example wheel cover assembly configured on a wheel according to the teachings of the present disclosure.

In one implementation, the flexible wheel cover 102 has a diameter that is less than a diameter of the tire 110 and greater than a diameter of the wheel 111, such that when the wheel 111 is rotating, the wheel cover 102 extends beyond the rim of the wheel 111 to provide an aesthetic impression of a larger rim and lower profile of the tire 110. For example, as shown in FIG. 5, in one implementation, the flexible wheel cover 102 has an outer diameter Dc that is relatively less than the diameter Dt formed by the outermost curvature of the tire 110. In this manner, the flexible wheel cover 102 will not be unduly affected by wind turbulence as the wheel moves down the road. Further, in one implementation, the wheel cover 102 has a weight embedded or otherwise included at or near the outer periphery of the wheel cover 102 to further facilitate the flattening of the wheel cover 102 during rotation of the wheel 111.

The flexible wheel cover 102 may be formed of any material capable of bending when the wheel 111 stationary and flattening under centrifugal forces caused by rotation of the wheel 111. For example, the material may comprise polyvinyl chloride (PVC) embedded polyester. In one implementation, the material of the wheel cover 102 has a relatively low susceptibility to changes in temperature, such that the flexible wheel cover 102 may be utilized in different climates and seasons of the year. Generally, the material of the wheel cover 102 has a flexibility that permits transitions between a bent state, as shown in FIG. 1, and a flattened state, as shown in FIG. 2, based on a rotation of the wheel 111 and a robustness that provides protection to components associated with the wheel 111 during movement of the vehicle.

In one implementation, the rotation of the wheel 111 causes the wheel cover 102 to flatten against the tire 110 as the vehicle approaches road speeds. For example, where the tire 110 is approximately 22.5 inches, a rotation of approximately 500 to 520 revolutions-per-minute (rpm) causes the wheel cover 102 to flatten against the tire 110. In another implementation, the wheel cover 102 may flatten against the tire 110 at any speed of, the vehicle.

The bracket 106 mounts the wheel cover 102 to the wheel hub 104, such that the wheel cover 102 is prevented from moving independently of the wheel 111 and/or the bracket 106. However, it will be appreciated by those skilled in the art that the wheel cover 102 may be mounted, directly or indirectly, to the wheel hub 104 and/or other components associated with the wheel 111 using bracket 106 or other mechanisms. As can be understood from FIGS. 3-4, in one implementation, the bracket 106 is formed from a piece of sheet metal bent into a U-like shape. The bracket 106 may be mounted or affixed to the wheel hub 104 using various mechanisms, for example, existing nuts or bolts used in connection with the wheel 111. In one implementation, the bracket 106 is mounted to the wheel hub 104 using nuts 112 that secure an axle cover of an axle on which the wheel 111 is mounted. In another implementation, the bracket 106 is mounted to the wheel hub 104 using bolts 113 onto which the wheel 111 is mounted to the axle. In other implementations, the bracket 106 is mounted onto the wheel hub 104 using any suitable mechanism, such as a resilient mechanism that provides a snap-fit attachment. The bracket 106 may include a hole 114 that is aligned with an axis of the wheel 111 when mounted thereon. In one implementation, the hole 114 secures the flexible wheel cover 102 to the bracket 106 using $_a$ bolt 116. However, other attachment and mounting mechanisms are contemplated.

Figure 6:
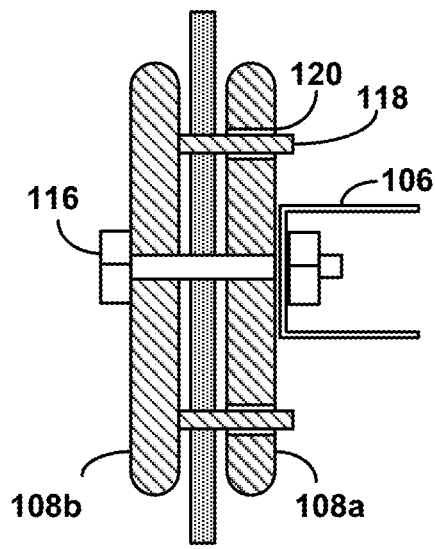
FIG. 6 illustrates an enlarged, partial view of various features of the wheel cover assembly according to the teachings of the present disclosure.

As can be understood from FIGS. 5-6, the inner disk 108a and the outer disk 108b sandwich the wheel cover 102 therebetween when the wheel cover 102 is mounted. In one implementation, the disks 108a and/or 108b include rounded, smooth surfaces to prevent or reduce tearing of the wheel cover 102, as well as increase aesthetic appeal and aerodynamic efficiency. The disks 108a and 108b may be any size suitable for the wheel 111 and/or the wheel cover 102. For example, the disks 108a and 108b may be approximately 6.0 inches in diameter. The disks 108a and 108b may be made from various materials, for example, an injection molded plastic, metal, ceramic, or the like.

Referring now to FIG. 6, in one implementation, the outer disk 108b includes one or more teeth 118 defining protrusions that extend through the wheel cover 102 and a corresponding one or more holes 120 defining depressions in the inner disk 108a. The teeth 118 transfer the rotational forces of the wheel 111 to the wheel cover 102, such that the wheel cover 102 rotates as the wheel rotates. It will be appreciated that the inner disk 108a and/or the outer disk 108b may include various arrangements of teeth, holes, and/or other attachment features. For example, one disk may have a sawtooth-like shape that mates with a complementary sawtooth-like shape of the other disk to engage and hold the flexible wheel cover 102. Additionally, the teeth may be formed on the outer disk 108b while the holes are formed in the inner disk 108a.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A flexible wheel cover assembly comprising:
   a flexible wheel cover comprising a sheet of material having an essentially round-shaped outer periphery and a center axis; and
   a bracket to physically couple the flexible wheel cover to a wheel hub of an vehicle such that the center axis of the flexible wheel cover is aligned with a wheel axis,
   wherein the sheet of material has a flexibility sufficient to bend while the wheel is stationary and flatten against a tire mounted on the wheel when the wheel is turning.

2. The wheel cover assembly of claim 1, further comprising an inner disk and an outer disk coupling the flexible wheel cover to the bracket, the inner and outer disks configured to sandwich the flexible sheet of material therebetween.

3. The wheel cover assembly of claim 2, wherein at least one of the inner disk and outer disk comprises a protrusion, and the other one of the inner disk and outer disk comprises a complementary depression for engaging the protrusion when the inner disk and outer disk are mounted on the bracket.

4. The wheel cover assembly of claim 1, wherein the outer periphery of the flexible wheel cover is greater than the diameter of the wheel and less than the diameter of the tire.

5. The wheel cover assembly of claim 1, wherein the sheet of material comprises polyvinyl chloride (PVC) embedded polyester.

6. The wheel cover assembly of claim 1, wherein the vehicle is a truck or trailer.

7. The wheel cover assembly of claim 6, wherein the flexible wheel cover is configured to indicate that the wheel is frozen according to whether or not the flexible wheel cover is flat against the wheel as the truck is moving.

8. The wheel cover assembly of claim 1, wherein the flexible wheel cover is configured to allow hands-free inspection of the wheel while the wheel is stationary.

9. The wheel cover assembly of claim 1, wherein the flexible wheel cover provides an impression of a larger rim and a lower profile tire when the flexible wheel cover is flattened against the tire mounted on the wheel.

* * * * *